United States Patent
Cheng et al.

(10) Patent No.: US 6,458,501 B1
(45) Date of Patent: *Oct. 1, 2002

(54) FORMING A TONER USING SURFACTANT-FREE EMULSION POLYMERIZATION

(75) Inventors: Chieh-Min Cheng, Rochester, NY (US); Grazyna E. Kmiecik-Lawrynowicz, Fairport, NY (US); Allan K. Chen, Oakville (CA)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,690

(22) Filed: Sep. 30, 1999

(51) Int. Cl.[7] ............ G03G 9/08; G03G 9/87; C08F 2/22; C08F 265/06; C08F 257/02
(52) U.S. Cl. .............. 430/135; 430/109; 430/136; 430/137; 430/905; 430/914; 524/458; 523/201; 526/201
(58) Field of Search ............ 524/458; 523/201; 526/201; 430/135, 136, 137, 905, 914, 109

(56) References Cited

U.S. PATENT DOCUMENTS

| | | | |
|---|---|---|---|
| 3,844,811 A | * 10/1974 | Brynko ............... | 106/309 |
| 3,882,070 A | * 5/1975 | Ceska ............... | 260/29.7 T |
| 4,378,272 A | * 3/1983 | Suwala et al. ....... | 162/152 |
| 4,427,836 A | * 1/1984 | Kowalski et al. .... | 525/301 |
| 5,346,797 A | 9/1994 | Kmiecik-Lawrynowicz et al. | |
| 5,418,108 A | 5/1995 | Kmiecik-Lawrynowicz et al. | |
| 5,455,315 A | * 10/1995 | Paine et al. ........ | 526/79 |
| 5,853,943 A | 12/1998 | Cheng et al. | |
| 5,922,501 A | 7/1999 | Cheng et al. | |

FOREIGN PATENT DOCUMENTS

| EP | 0 022 633 A | | 1/1981 | |
|---|---|---|---|---|
| WO | WO-9839372 | * | 9/1998 | ......... C08F/285/00 |

* cited by examiner

Primary Examiner—David W. Wu
Assistant Examiner—Kelechi C. Egwim
(74) Attorney, Agent, or Firm—Oliff & Berridge, PLC; Euguene Palazzo

(57) ABSTRACT

The latex of an emulsion aggregation toner is prepared without the use of a surfactant. The process comprises preparing an emulsion of monomers in water without a surfactant; adding a free radical initiator to at least a portion of the emulsion to initiate seed polymerization to form seed polymer, wherein the free radical initiator attaches to the seed polymer to form ionic, hydrophilic end groups on the seed polymer; and adding additional monomer to the composition to complete polymerization to form a latex polymer.

18 Claims, No Drawings

FORMING A TONER USING SURFACTANT-FREE EMULSION POLYMERIZATION

BACKGROUND OF THE INVENTION

1. Field of Invention

The invention relates to a surfactant-free emulsion polymerization process and to a method for preparing emulsion aggregation toners wherein the latex is formed by surfactant-free emulsion polymerization. The aforementioned toners are especially useful for imaging processes, especially xerographic processes, which usually require high toner transfer efficiency, such as those having a compact machine design without a cleaner or those that are designed to provide high quality colored images with excellent image resolution and signal-to-noise ratio, and image uniformity.

2. Description of Related Art

It is known in the art to form toners by aggregating a colorant with a latex polymer formed by emulsion polymerization. For example, U.S. Pat. No. 5,853,943, which is herein incorporated by reference, is directed to a process for preparing a latex by first forming a seed polymer. In particular, the '943 patent describes a process comprising:

(i) providing a reactor with an initial liquid composition comprising water and disulfonate surfactant or surfactants;

(ii) conducting a pre-reaction monomer emulsification which comprises emulsification of the polymerization reagents of monomers, chain transfer agent, the composition of step (i), and optional, but preferably, an initiator, wherein the emulsification is accomplished at a low temperature of, for example, from about 5° C. to about 40° C.;

(iii) preparing a seed particle latex by aqueous emulsion polymerization of a mixture comprised of (a) part of the monomer emulsion, from about 0.5 to about 50 percent by weight, and preferably from about 3 to about 25 percent by weight, of the monomer emulsion prepared in (ii), and (b) a free radical initiator, from about 0.5 to about 100 percent by weight, and preferably from about 3 to about 100 percent by weight, of the total initiator used to prepare the latex polymer at a temperature of from about 35° C. to about 125° C., wherein the reaction of the free radical initiator and monomer produces the seed latex comprised of latex resin wherein the particles are stabilized by surfactants;

(iv) heating and feed adding to the formed seed particles the remaining monomer emulsion, from about 50 to about 99.5 percent by weight, and preferably from about 75 to about 97 percent by weight, of the monomer emulsion prepared in (ii), and optionally a free radical initiator, from about 0 to about 99.5 percent by weight, and preferably from about 0 to about 97 percent by weight, of the total initiator used to prepare the latex polymer at a temperature from about 35° C. to about 125° C.; and (v) retaining the above contents in the reactor at a temperature of from about 35° C. to about 125° C. for an effective time period to form the latex polymer, for example from about 0.5 to about 8 hours, and preferably from about 1.5 to about 6 hours, followed by cooling.

In known emulsion polymerization processes, a surfactant (that is, an emulsifier) is used to stabilize the emulsion during emulsion polymerization. The presence of a good surfactant is important for stabilizing the emulsion polymerization process. However, the same surfactants that contribute advantage in the emulsion polymerization step can be detrimental to the quality or processing of the final toners. In particular, the presence of a surfactant can contribute to problems such as filter blinding, over-dispersed particles, persistent emulsion and/or undesirable final toner characteristics, such as sensitivity to relative humidity, low tribo charge, dielectric loss, aging and poor toner flow.

Current emulsion aggregation processes have a disadvantage in that tribo charge depends on environmental changes to a large extent. Tribo charge declination is observed especially in an environment of high temperature and high humidity. This suggests that the tribo charge of the emulsion aggregation toner particles at high relative humidity can be controlled by avoiding the presence of surfactants on the particle surface. Another disadvantage is that the adhesive properties between the toner particles and the substrate is poor at high relative humidity owing to the presence of surfactants on the particles.

As a result, surfactants used in emulsion aggregation emulsion polymerization processes should be removed from the particle by washing to obtain useful tribo electric properties. However, surfactants for emulsion polymerization are known to form hydrogen-bonded complexes with carboxylic acids and are thus difficult to remove from the surface of acrylic acid-containing particles in particular. In addition, often the removal of these surfactants from the emulsion aggregation particles is very tedious and resource consuming, since surfactant removal is an equilibrium process and requires acceleration in order to be cost-effective.

Processes that eliminate or at least minimize the need for surfactants are therefore desired.

SUMMARY OF THE INVENTION

The present invention is directed to a method for preparing latex polymers by an emulsion polymerization process that does not require the addition of surfactants. The process provides for emulsion aggregation toners with good tribo charge stability, especially in an environment of high temperature and high humidity. In addition, because surfactants do not remain with the latex particles, the toner tribo charge is not as influenced by environmental changes. Furthermore, the process of the present invention can provide for a surfactant-free emulsion with high solids loading, such as greater than 40 wt %.

The process of the present invention comprises preparing an emulsion of monomers in water without the use of surfactants. In particular, neither ionic nor nonionic surfactants are used. To form the emulsion, a monomer is generally added to water and agitated to form an emulsion.

After the emulsion has been formed, a free radical initiator is then mixed with at least a portion of the emulsion to initiate seed polymerization. In this process, the initiator is a free radical initiator that attaches to the seed polymer to form ionic, hydrophilic end groups on the polymer.

After forming seed particles, additional monomer is then added to the composition to complete polymerization thus forming a latex polymer. The monomer added after seed polymerization may or may not be in the form of a monomer emulsion. During this process, additional initiator may also be added. If added, this initiator is preferably a free radical initiator. It can, but need not, be a free radical initiator that attaches to the polymer to form ionic, hydrophilic end groups on the polymer.

After forming the latex polymer, the latex may then be aggregated with a colorant, preferably in the form of a colorant dispersion, to form aggregate particles that are then coalesced or fused to form toner particles.

In forming the latex, it is not necessary to add any surfactant to the composition. However, surfactant may be present in or added to the colorant dispersion. As such, even if no surfactant is used in forming the latex polymer, surfactant may be present in the toner formed. However, the free emulsion aggregation approach in which no surfactant is used in forming the latex polymer provides for toner with less surfactant. In particular, using the surfactant-free latexes in emulsion aggregation toner will generally enable at least 85% surfactant reduction since the bulk of the surfactant in typical toners comes from the latex rather than from the colorant dispersion. Such emulsion aggregation toner particles require considerably less washing, if any, to achieve maximum tribo levels than is needed with the surfactant-containing latexes.

DETAILED DESCRIPTION OF PREFERRED EMBODIMENTS

One or more monomers may be used to form a latex polymer in the present invention. Any suitable monomers may be used. Monomers particularly useful in the surfactant-free process of the present invention include, but are not limited to, acrylic and methacrylic esters, styrene, vinyl esters of aliphatic acids, ethylenically unsaturated carboxylic acids and known crosslinking agents. Suitable ethylenically unsaturated carboxylic acids can be acrylic acid, methacrylic acid, itaconic acid, maleic acid, fumaric acid, 2-carboxyethyl acrylate ($\beta$CEA), and the like. Preferably, more than one monomer is used. In particular, the monomers preferably include styrene, n-butyl acrylate and/or $\beta$CEA.

The monomers are mixed with water to form an emulsion. The emulsification is generally accomplished at a temperature of about 5° C. to about 40° C. However, the emulsion may also be formed at higher temperatures in particular. To form an emulsion, the mixture is generally agitated at, for example, at least 100 rpm, and preferably at least 400 rpm, for sufficient time to form an emulsion in the absence of a surfactant. The time required to form an emulsion is generally less if the mixture is agitated at a higher speed. In addition, the agitation speed may even be less than 100 rpm if the agitation is continued for a sufficient amount of time.

In addition, a chain transfer agent is preferably added to the monomer emulsion to control the molecular weight properties of the polymer to be formed. Chain transfer agents that may be used in the present invention include, but are not limited to, dodecanethiol, butanethiol, isooctyl-3-mercaptopropionate (IOMP), 2-methyl-5-t-butylthiophenol, carbon tetrachloride, carbon tetrabromide, and the like. Chain transfer agents may be used in any effective amount, such as from about 0.1 to about 10 percent by weight of the monomer in the monomer emulsion.

The monomer emulsion is used to form a latex polymer. In an embodiment of the invention, the entire amount of the monomer that will be used to form the latex polymer is included in the monomer emulsion. In this case, only a portion of the monomer emulsion is mixed with the free radical initiator to form seed polymer. Alternatively, only the portion of the monomer to be used in forming the seed polymer is included in the monomer emulsion. In this case, all of the monomer emulsion is mixed with the free radical emulsion to form seed polymer.

The portion of the monomer used to form the seed polymer is generally from about 0.5 to about 50 percent by weight of the total amount of monomer used to prepare the latex polymer. Preferably, the amount of monomer used to form the seed polymer is from about 3 to 25 percent by weight of the total amount of monomer used to form the latex polymer.

The polymerization initiator mixed with at least a portion of the monomer emulsion to form seed polymer is a free radical initiator that attaches to the polymer forming ionic, hydrophilic end groups on the polymer. The presence of these ionic, hydrophilic end groups on the polymer stabilizes the latex. The stability results from the electrostatic repulsion of the charged groups on a given latex particle with respect to those on the other particles. Suitable initiators include, but are not limited to, ammonium persulfate, potassium persulfate, sodium persulfate, ammonium persulfite, potassium persulfite, sodium persulfite, ammonium bisulfate, sodium bisulfate, 1,1'-azobis(1-methylbutyronitrile-3-sodium sulfonate), and 4,4'-azobis(4-cyanovaleric acid). Preferably, the initiator is a persulfate initiator such as ammonium persulfate, potassium persulfate, sodium persulfate and the like. The initiator is generally added as part of an initiator solution in water.

The amount of initiator used to form the latex polymer is generally from about 0.1 to about 10 percent by weight of the monomer to be polymerized. From 5 to 100 percent by weight, and preferably from 30 to 100 percent by weight, of the total amount of initiator to be used to prepare the latex polymer is added during the seed polymerization stage.

In forming the seed polymer, the emulsion polymerization is generally conducted at a temperature of from about 35° C. to about 125° C. The initiator is generally added to the emulsion fairly slowly in order to maintain the stability of the system. For example, the initiator is preferably added over the course of at least 5 minutes, more preferably over the course of at least 10 minutes.

Additional monomer is then added to the seed polymer to complete the polymerization. The emulsion polymerization is generally conducted at a temperature of from about 35° C. to about 125° C. The additional monomer is generally fed to the composition at an effective time period of, for example, 0.5 to 10 hours, preferably 2 to 6 hours. The additional monomer may be in the form of a monomer emulsion. In particular, the monomer may be the remainder of the monomer emulsion used to form the seed polymer after a portion is removed to form the seed polymer.

In addition, additional initiator may or may not be added after the seed polymerization. If additional initiator is added during this phase of the reaction, it may or may not be of the same type as the initiator added to form the seed polymer. However, the initiator is preferably a free radical initiator. Initiators useful during this step of the process include, but are not limited to, the above-mentioned initiators as well as hydrogen peroxide, t-butyl hydroperoxide, cumene hydroperoxide, paramethane hydroperoxide, benzoyl peroxide, tert-butyl peroxide, cumyl peroxide, 2,2'-azobisisobutyronitrile, 2,2'-azobis(2-methylbutyronitrile), 2,2'-azobis(2-amidinopropane)dihydrochloride, 2,2'-azobisisobutyl amide dihydrate, 2,2'-azobis[2-(2-imidazolin-2-yl)propane]dihydrochloride, and 2,2'-azobis[2-(5-methyl-2-imidazolin-2-yl)propane]dihydrochloride.

Illustrative examples of latex polymers that may be formed by the process of the present invention include, but are not limited to, known polymers such as poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylatebutadiene), poly(propyl acrylate-butadiene), poly(butyl acrylatebutadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and the like.

In embodiments, the present invention is directed to processes for the preparation of toner that comprise blending a colorant, preferably a colorant dispersion, more preferably containing a pigment, such as carbon black, phthalocyanine, quinacridone or RHODAMINE B.TM. type, with a latex polymer prepared as illustrated herein and optionally with a flocculant and/or charge additives; heating the resulting flocculent mixture at a temperature below the Tg of the latex polymer, preferably from about 25° C. to about 1° C. below the Tg of the latex polymer, for an effective length of time of, for example, 0.5 hour to about 2 hours, to form toner sized aggregates; subsequently heating the aggregate suspension at a temperature at or above the Tg of the latex polymer, for example from about 60° C. to about 120° C., to effect coalescence or fusion, thereby providing toner particles; and isolating the toner product, such as by filtration, thereafter optionally washing and drying the toner particles, such as in an oven, fluid bed dryer, freeze dryer, or spray dryer.

The latex polymer is generally present in the toner compositions in various effective amounts, such as from about 75 weight percent to about 98 weight percent of the toner, and the latex polymer size suitable for the processes of the present invention can be, for example, of from about 0.05 micron to about 1 micron in volume average diameter as measured by the Brookhaven nanosize particle analyzer. Other sizes and effective amounts of latex polymer may be selected in embodiments.

Colorants include pigments, dyes, and mixtures of pigments with dyes, and the like. The colorant is generally present in the toner in an effective amount of, for example, from about 1 to about 15 percent by weight of toner, and preferably in an amount of from about 3 to about 10 percent by weight of the toner.

Illustrative examples of colorants, such as pigments, that may be used in the processes of the present invention include, but are not limited to, carbon black, such as REGAL 330.RTM.; magnetites, such as Mobay magnetites MO8029.TM., MO8060.TM.; Columbian magnetites; MAPICO BLACKS.TM. and surface treated magnetites; Pfizer magnetites CB4799.TM., CB5300.TM., CB5600.TM., MCX6369.TM.; Bayer magnetites, BAYFERROX 8600.TM., 8610.TM.; Northern Pigments magnetites, NP-604.TM., NP-608.TM.; Magnox magnetites TMB-100.TM., or TMB-104.TM.; and the like. Colored pigments or dyes, including cyan, magenta, yellow, red, green, brown, blue and/or mixtures thereof, may also be used. Generally, cyan, magenta, or yellow pigments or dyes, or mixtures thereof, are used.

Specific examples of pigments include, but are not limited to, phthalocyanine HELIOGEN BLUE L6900.TM., D6840.TM., D7080.TM., D7020.TM., PYLAM OIL BLUE.TM., PYLAM OIL YELLOW.TM., PIGMENT BLUE 1.TM. available from Paul Uhlich & Company, Inc., PIGMENT VIOLET 1.TM., PIGMENT RED 48.TM., LEMON CHROME YELLOW DCC 1026.TM., E.D. TOLUIDINE RED.TM. and BON RED C.TM. available from Dominion Color Corporation, Ltd., Toronto, Ontario, NOVAPERM YELLOW FGL.TM., HOSTAPERM PINK E.TM. from Hoechst, and CINQUASIA MAGENTA.TM. available from E.I. DuPont de Nemours & Company, and the like. Examples of magentas include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK.TM., and cyan components may also be selected as pigments with the process of the present invention.

Flocculants may be used in effective amounts of, for example, from about 0.01 percent to about 10 percent by weight of the toner. Flocculants that may be used include, but are not limited to, polyaluminum chloride (PAC), dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL.TM. and ALKAQUAT.TM. available from Alkaril Chemical Company, SANIZOL.TM. (benzalkonium chloride), available from Kao Chemicals, and the like.

Charge additives may also be used in suitable effective amounts of, for example, from 0.1 to 5 weight percent by weight of the toner. Suitable charge additives include, but are not limited to, alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

The following examples illustrate specific embodiments of the present invention. One skilled in the art will recognize that the appropriate reagents, component ratio/concentrations may be adjusted as necessary to achieve specific product characteristics. All parts and percentages are by weight unless otherwise indicated.

EXAMPLES

Example I

Surfactant-Free Latex Synthesis (1)

A surfactant-free latex (CMC 28442-47) comprising styrene/n-butyl acrylate/βCEA copolymer of 75:25:6 composition is synthesized by a surfactant-free emulsion polymerization process using 1.5% of ammonium persulfate initiator.

In a 2 L jacketed glass flask with a stirrer (a four-blade steel propeller) set at 250 rpm, 519 grams of deionized water are deaerated for 30 minutes while the temperature is raised to 80° C. A monomer emulsion is prepared by homogenizing a monomer mixture (405 grams of styrene, 135 grams of n-butyl acrylate, 32.4 grams of 2-carboxyethyl acrylate (βCEA), and 7.12 grams of 1-dodecanethiol, which is a chain transfer agent) with 251 grams of deionized water at 10,000 rpm for 6 minutes at room temperature. 41 grams of seed are taken from the monomer emulsion and added into the flask, which is stirred for 10 minutes at 400 rpm. An initiator solution prepared from 8.1 grams of ammonium persulfate in 40 grams of deionized water is added over 20 minutes. Stirring is continued for an additional 20 minutes to allow seed particle formation. The remaining monomer emulsion is fed into the flask over 180 minutes. At the conclusion of the monomer feed, the composition is post-heated at 80° C. for 120 minutes, then cooled. The reaction system is deoxygenated by passing a stream of nitrogen through it during the reaction.

A latex containing 42 percent solids with an average particle size of 293 nm is obtained. This latex has a Mw of 33,000 and a midpoint Tg of 54° C. This latex is very stable and almost sediment-free. No sediment is observed after the latex is allowed to stand for two weeks. The amount of sediment determined via centrifugation at 3120 G-force for 50 seconds is 0.6% of the latex.

Example II
Surfactant-Free Latex Synthesis (2)

A surfactant-free latex (CMC 28442-42) comprising styrene/n-butyl acrylate/βCEA copolymer of 80:20:3 composition is synthesized by a surfactant-free emulsion polymerization process using 1.5% of ammonium persulfate initiator.

In a 2 L jacketed glass flask with a stirrer (a four-blade steel propeller) set at 250 rpm, 519 grams of deionized water are deaerated for 30 minutes while the temperature is raised to 80° C. A monomer emulsion is prepared by mixing a monomer mixture (432 grams of styrene, 108 grams of n-butyl acrylate, 16.2 grams of 2-carboxyethyl acrylate (βCEA), and 5.4 grams of 1-dodecanethiol) with 251 grams of deionized water at 400 rpm for 10 minutes at room temperature. 41 grams of seed is taken from the monomer emulsion and added into the flask, which is stirred for 10 minutes at 400 rpm. An initiator solution prepared from 8.1 grams of ammonium persulfate in 40 grams of deionized water is added over 20 minutes. Stirring is continued for an additional 20 minutes to allow seed particle formation. The remaining monomer emulsion is fed into the flask over 180 minutes. At the conclusion of the monomer feed, the composition is post-heated at 80° C. for 120 minutes, then cooled. The reaction system is deoxygenated by passing a stream of nitrogen through it during the reaction.

A latex containing 42 percent solids with an average particle size of 612 nm is obtained. This latex has a Mw of 48,600 and a midpoint Tg of 64° C. This latex is very stable and almost sediment-free. No sediment is observed after the latex is allowed to stand for two weeks. The amount of sediment determined via centrifugation at 3120 G-force for 50 seconds is 0.5% of the latex.

Example III
Surfactant-Free Latex Synthesis (3)

A surfactant-free latex (CMC 28442-51) comprising styrene/n-butyl acrylate/βCEA copolymer of 80:20:3 composition is synthesized by surfactant-free emulsion polymerization process using 1.5% of ammonium persulfate initiator.

In a 2 L jacketed glass flask with a stirrer (a four-blade steel propeller) set at 250 rpm, 770 grams of deionized water are deaerated for 30 minutes while the temperature is raised to 80° C. A monomer mixture is prepared by mixing 432 grams of styrene, 108 grams of n-butyl acrylate, 16.2 grams of 2-carboxyethyl acrylate (βCEA), and 5.4 grams of 1-dodecanethiol at room temperature. 5.4 grams of seed is taken from the monomer mixture and added into the flask, which is stirred for 10 minutes at 400 rpm to form an emulsion. An initiator solution prepared from 8.1 grams of ammonium persulfate in 40 grams of deionized water is added over 7 minutes. Stirring is continued for an additional 20 minutes to allow seed particle formation. The remaining monomer mixture is fed into the flask over 180 minutes. At the conclusion of the monomer feed, the composition is post-heated at 80° C. for 120 minutes, then cooled. The reaction system is deoxygenated by passing a stream of nitrogen through it during the reaction.

A latex containing 42 percent solids with an average particle size of 176 nm is obtained. This latex has a Mw of 36,000 and a midpoint Tg of 63° C. This latex is very stable and almost sediment-free. No sediment is observed after the latex is allowed to stand for two weeks. The amount of sediment determined via centrifugation at 3120 G-force for 50 seconds is 0.1% of the latex.

Example IV
Surfactant-Free Latex Synthesis (4)

A surfactant-free latex (CMC 28442-60) comprising styrene/n-butyl acrylate/acrylic acid copolymer of 80:20:1.5 composition is synthesized by surfactant-free emulsion polymerization process using 1.5% of ammonium persulfate initiator.

In a 2 L jacketed glass flask with a stirrer (a four-blade steel propeller) set at 250 rpm, 770 grams of deionized water are deaerated for 30 minutes while the temperature is raised to 80° C. A monomer mixture is prepared by mixing 432 grams of styrene, 108 grams of n-butyl acrylate, 8.1 grams of acrylic acid, and 5.4 grams of 1-dodecanethiol at room temperature. 5.4 grams of seed is taken from the monomer mixture and added into the flask, which is stirred for 10 minutes at 400 rpm to form an emulsion. An initiator solution prepared from 8.1 grams of ammonium persulfate in 40 grams of deionized water is added over 8 minutes. Stirring is continued for an additional 20 minutes to allow seed particle formation. The remaining monomer mixture is fed into the flask over 180 minutes. At the conclusion of the monomer feed, the composition is post-heated at 80° C. for 120 minutes, then cooled. The reaction system is deoxygenated by passing a stream of nitrogen through it during the reaction.

A latex containing 42 percent solids with an average particle size of 174 nm is obtained. This latex has a Mw of 26,000 and a midpoint Tg of 61° C. This latex is very stable and almost sediment-free. No sediment is observed after the latex is allowed to stand for two weeks. The amount of sediment determined via centrifugation at 3120 G-force for 50 seconds is 0.1% of the latex.

Comparative Example I
Latex Synthesis

A latex (CMC 28442-73) comprising styrene/n-butyl acrylate/βCEA copolymer of 75:25:6 composition is synthesized by a surfactant-free emulsion polymerization process using 1.5% of t-butyl hydroperoxide.

In a 2 L jacketed glass flask with a stirrer (a four-blade steel propeller) set at 250 rpm, 519 grams of deionized water are deaerated for 30 minutes while the temperature is raised to 80° C. A monomer emulsion is prepared by homogenizing a monomer mixture (405 grams of styrene, 135 grams of n-butyl acrylate, 32.4 grams of 2-carboxyethyl acrylate (βCEA), and 7.12 grams of 1-dodecanethiol) with 251 grams of deionized water at 10,000 rpm for 6 minutes at room temperature. 41 grams of seed are taken from the monomer emulsion and added into the flask, which is stirred for 10 minutes at 400 rpm. An initiator solution prepared from 8.1 grams of t-butyl hydroperoxide in 40 grams of deionized water is added over 20 minutes. Stirring is continued for an additional 20 minutes to allow seed particle formation. The remaining monomer emulsion is fed into the flask over 180 minutes. At the conclusion of the monomer feed, a mass coagulum of latex was observed. The composition is post-heated at 80° C. for 120 minutes, then cooled. Only 12 wt % of latex is recovered after the reaction mixture is filtered through a 45 micron screen filter. The reaction system is deoxygenated by passing a stream of nitrogen through it during the reaction.

The latex collected containing 16 percent solids with an average particle size of 675 nm is obtained. This latex has a Mw of 31,000 and a midpoint Tg of 53° C. This latex is not stable and possesses sediment. Sediment is observed after the latex is allowed to stand for two weeks. The amount of sediment determined via centrifugation at 3120 G-force for 50 seconds is 32% of the latex.

As compared to this Comparative Example I, Examples I to IV demonstrate that surfactant-free latexes can be prepared by using a free radical initiator, such as ammonium persulfate, capable of producing hydrophilic ionic end groups, which provides the latex stability and yields latexes with no sediment.

Example V
Toner Particle Preparation from Surfactant-Free Latex by Aggregation/Coalescence Process Using Polyaluminium Chloride (PAC) as Flocculant A. 6 Micron Cyan Toner Particles by PAC A/C Process A surfactant-free latex produced in Example I above is utilized in an Aggregation/Coalescence process to produce 6 micron particles with a narrow size distribution.

500 g of deionized water is placed in a stainless steel beaker and homogenized at 5000 rpm, while 300 g of latex CMC-28442-47 of Example I is added, followed by the addition of a pigment dispersion prepared from 8.7 g of cyan pigment dispersion BHD 6000 (supplied by San Chemical) diluted with 110 g of deionized water. To this homogenized latex/pigment blend, 2.4 g of 10% PAC solution diluted with 24 g of 0.02N $HNO_3$ is added drop-wise to cause a flocculation. After the addition is complete, homogenization is continued for additional 2 minutes to form a creamy blend. The creamy blend is then transferred into a 2 L glass reactor and stirred at 350 rpm, while being heated to 52–53° C. Particle growth is monitored during heating. When the particle size by volume is equal to 6.42 (GSD=1.17), the pH of the slurry is adjusted to 7.5 by the addition of 2% NaOH and the speed in the reactor is reduced to 200 rpm. After ½ hour of stirring at 53° C., the temperature in the reactor is raised to 95° C. After 1 hour of heating at 95° C., the pH of the slurry is adjusted to 4.3 and the heating is continued for an additional 4 hours. After that, the reactor content is cooled down and is discharged.

6.3 µm cyan particles with GSD=1.20 and potato type morphology is produced in this process. The particles are washed three times. After the third wash, there are not any detectable amounts of any residual chemicals, including aluminum, copper, chlorides, fluorides, nitrates, sulfates, diols, glycols and alkylarylalkoxylates, from the toner left in the wash water. To detect the residual chemicals, surface tension and pH measurements, liquid chromatography, gas chromatography, ion chromatography and mass spectroscopy are used. The toner particles have tribo charges of a 60° C./20% RH tribo charge (blow-off) of −46.5 µC/g, a 70° C./50% RH tribo charge (blow-off) of −28.7 µC/g and an 80° C./80% RH tribo charge (blow-off) of −21.1 µC/g.

B. 7 Micron Cyan Particles by PAC A/C Process

A surfactant-free latex produced in Example I above is utilized in an Aggregation/Coalescence process to produce 7 micron particles with a narrow size distribution.

500 g of deionized water is placed in a stainless steel beaker and homogenized at 5000 rpm, while 300 g of latex CMC-28442-47 of Example I is added, followed by the addition of a pigment dispersion prepared from 8.7 g of cyan pigment dispersion BHD 6000 (supplied by San Chemical) diluted with 110 g of deionized water. To this homogenized latex/pigment blend, 2.6 g of 10% PAC solution diluted with 24 g of 0.02N $HNO_3$ is added drop-wise to cause a flocculation. After the addition is complete, homogenization is continued for an additional 2 minutes to form a creamy blend. The creamy blend is then transferred into a 2 L glass reactor and stirred at 350 rpm, while being heated to 54° C. Particle growth is monitored during heating. When the particle size by volume is equal to 6.8 (GSD=1.17), the pH of the slurry is adjusted to 7.2 by the addition of 2% NaOH and the speed in the reactor is reduced to 200 rpm. After ½ hour of stirring at 54° C., the temperature in the reactor is raised to 95° C. After 1 hour of heating at 95° C., the pH is adjusted to 4.5 and the heating is continued for an additional 1 hour. Then pH is again adjusted to 4.0. Heating is continued for an additional 6 hours to coalesce particles. After coalescence, the reactor content is cooled down and discharged.

6.8 µm cyan particles with GSD=1.21 is produced in this process. The particles are washed three times. After the third wash, there are not any detectable amounts of any residual chemicals, including aluminum, copper, chlorides, fluorides, nitrates, sulfates, diols, glycols and alkylarylalkoxylates, from the toner left in the wash water. To detect the residual chemicals, surface tension and pH measurements, liquid chromatography, gas chromatography, ion chromatography and mass spectroscopy are used. The toner particles have tribo charges of a 60° C./20% RH tribo charge (blow-off) of −46.6 µC/g, a 70° C./50% RH tribo charge (blow-off) of −26.5 µC/g and an 80° C./80% RH tribo charge (blow-off) of −22.1 µC/g.

C. 7 Micron Cyan Particles by Sanizol/PAC A/C Process

A surfactant-free latex produced in Example I above is utilized in an Aggregation/Coalescence process to produce 7 micron particles with a narrow size distribution.

600 g of deionized water is placed in a stainless steel beaker and homogenized at 5000 rpm, while 330 g of the latex CMC-28442-47 of Example I is added, followed by the addition of a pigment dispersion prepared from 9.7 of cyan pigment dispersion BHD 6000 (supplied by San Chemical) diluted with 57 g of deionized water. To this homogenized latex/pigment blend, 1.13 g of 10% PAC solution diluted with 4 g of 0.02N $HNO_3$ is added drop-wise, followed by the addition of 1.13 g of Sanizol (diluted with 6 g of deionized water) to cause a flocculation. After the addition is complete, homogenization is continued for an additional 2 minutes to form a viscous blend. The viscous blend is then transferred into a 2 L glass reactor and stirred at 600 rpm, while being heated to 50–52° C. Particles are continuously growing with time while being heated. When the particle size by volume is equal to 6.5 (GSD=1.24), the pH of the slurry is adjusted to 5.7 by the addition of 2% NaOH, and the speed in the reactor is reduced to 200 rpm. After ½ hour of stirring at 52° C., the temperature in the reactor is raised to 95° C. After 1 hour of heating at 95° C., the pH of a slurry is adjusted to 4.3 and the heating is continued for additional 4 hours. Thereafter, the reactor content is cooled down and discharged.

7.0 $\mu$m cyan particles with GSD=1.24 are produced in this process. The particles are washed three times. After the third wash, there are not any detectable amounts of any residual chemicals, including aluminum, copper, chlorides, fluorides, nitrates, sulfates, diols, glycols and alkylarylalkoxylates, from the toner left in the wash water. To detect the residual chemicals, surface tension and pH measurements, liquid chromatography, gas chromatography, ion chromatography and mass spectroscopy are used. The toner particles have tribo charges of a 60° C./20% RH tribo charge (blow-off) of −43.7 $\mu$C/g, a 70° C./50% RH tribo charge (blow-off) of −28.8 $\mu$C/g and an 80° C./80% RH tribo charge (blow-off) of −13.5 $\mu$C/g.

Comparative Example II
Toner Particle Preparation from Surfactant Latex by Aggregation/Coalescence Process Using Polyaluminium Chloride (PAC) as Flocculant A. Latex Synthesis with Surfactants:

A latex (CMC 28442-48) comprising styrene/n-butyl acrylate/βCEA copolymer of 75:25:6 composition is synthesized by an emulsion polymerization process, using 1.5% of ammonium persulfate initiator. The process also uses sodium dodecylbenzene sulfonate and polyoxyethylene nonylphenyl ether as surfactants.

In a 2 L jacketed glass flask with a stirrer (a four-blade steel propeller) set at 250 rpm, an aqueous solution containing 4.2 grams of sodium dodecylbenzene sulfonate anionic surfactant (available from Aldrich), 3.0 grams of polyoxyethylene nonylphenyl ether nonionic surfactant ANTAROX CA-897 (70 percent active, available from Rhodia), and 519 grams of deionized water is deaerated for 30 minutes while the temperature is raised to 80° C. A monomer emulsion is prepared by homogenizing a monomer mixture (405 grams of styrene, 135 grams of n-butyl acrylate, 32.4 grams of 2-carboxyethyl acrylate (βCEA), and 7.12 grams of 1-dodecanethiol) with an aqueous solution (2.1 grams of sodium dodecylbenzene sulfonate, 1.5 grams of ANTAROX CA-897, and 251 grams of deionized water) at 10,000 rpm for 6 minutes at room temperature. 42 grams of seed are taken from the monomer emulsion and added into the flask, which is stirred for 10 minutes at 400 rpm. An initiator solution prepared from 8.1 grams of ammonium persulfate in 40 grams of deionized water is added over 20 minutes. Stirring is continued for an additional 20 minutes to allow seed particle formation. The remaining monomer emulsion is fed into the flask over 180 minutes. At the conclusion of the monomer feed, the composition is post-heated at 80° C. for 120 minutes, then cooled. The reaction system is deoxygenated by passing a stream of nitrogen through it during the reaction.

A latex containing 42 percent solids with an average particle size of 225 nm is obtained. This latex has a Mw of 29,000 and a midpoint Tg of 54° C. This latex is very stable and almost sediment-free. No sediment is observed after the latex is allowed to stand for two weeks. The amount of sediment determined via centrifugation at 3120 G-force for 50 seconds is 0.3% of the latex.

B. 6 Micron Cyan Toner Particles by PAC A/C Process:

A surfactant latex produced in this example is utilized in an Aggregation/Coalescence process to produce 6 micron particles with a narrow size distribution.

500 g of deionized water is placed in a stainless steel beaker and homogenized at 5000 rpm, while 300 g of latex CMC-28442-48 is added, followed by the addition of a pigment dispersion prepared from 8.7 g of cyan pigment dispersion BHD 6000 (supplied by San Chemical) diluted with 110 g of deionized water. To this homogenized latex/pigment blend, 2.4 g of 10% PAC solution diluted with 24 g of 0.02N HNO$_3$ is added drop-wise to cause a flocculation. After the addition is complete, homogenization is continued for additional 2 minutes to form a creamy blend. The creamy blend is then transferred into a 2 L glass reactor and stirred at 350 rpm, while being heated to 52–53° C. Particle growth is monitored during heating. When the particle size by volume is equal to 6.32 (GSD=1.18), the pH of the slurry is adjusted to 7.5 by the addition of 2% NaOH and the speed in the reactor is reduced to 200 rpm. After ½ hour of stirring at 53° C., the temperature in the reactor is raised to 95° C. After 1 hour of heating at 95° C., the pH of the slurry is adjusted to 4.3 and the heating is continued for an additional 4 hours. After that, the reactor content is cooled down and is discharged.

6.5 $\mu$m cyan particles with GSD=1.21 and potato type morphology is produced in this process. The particles are washed three times. After the third wash, there are detectable amounts of residual chemicals, including aluminum, copper, chlorides, fluorides, nitrates, sulfates, diols, glycols and alkylarylalkoxylates, from the toner left in the wash water, in an amount of 0.5 to 2 mg/g of toner. To detect the residual chemicals, surface tension and pH measurements, liquid chromatography, gas chromatography, ion chromatography and mass spectroscopy are used. The toner particles have tribo charges of a 60° C./20% RH tribo charge (blow-off) of −19.4 $\mu$C/g, a 70° C./50% RH tribo charge (blow-off) of −10.6 $\mu$C/g and an 80° C./80% RH tribo charge (blow-off) of −4.5 $\mu$C/g.

As compared with this Comparative Example II, toner particles in Example V show a marked improvement in tribo values when the toners particles are prepared with surfactant-free latexes.

What is claimed is:

1. A process for preparing toner, comprising:

(i) preparing a surfactant-free composition comprising monomers and water and no seed polymer;

(ii) adding a free radical initiator over the course of at least five minutes to at least a portion of said surfactant-free composition to initiate seed polymerization to form seed polymer without the addition of surfactant, wherein said free radical initiator attaches to said seed polymer, forming ionic, hydrophilic end groups on the seed polymer;

(iii) adding additional monomer to the composition formed in (ii) to complete emulsion polymerization thus forming a latex polymer;

(iv) aggregating a colorant with the latex polymer; and (v) coalescing or fusing the aggregates to form toner particles.

2. A process according to claim 1, wherein no surfactant is used in the preparation of the latex polymer of (iii).

3. A process according to claim 1, wherein the colorant is in a dispersion, which contains a surfactant.

4. A process according to claim 1, further comprising adding a flocculant to the latex polymer before the latex polymer is aggregated with the colorant.

5. A process according to claim 1, wherein said aggregates further compose a charge control agent.

6. A process according to claim 1, wherein the colorant is a pigment.

7. A process according to claim 1, wherein the colorant is a dye.

8. A process according to claim 1, wherein said free radical initiator is added over course of at least ten minutes.

9. A process according to claim 1, wherein said surfactant-free composition further comprises a chain transfer agent.

10. A process according to claim 1, wherein said monomer added in (iii) is in the form a surfactant-free composition comprising monomers and water.

11. A process according to claim 10, wherein only a portion of the surfactant-free composition of (i) is used in (ii) and the remainder of the surfactant-free composition of (i) is added in (iii).

12. A process according to claim 11, wherein said portion of the surfactant-free composition used in (ii) is about 0.5 to 50% by weight of the surfactant-free composition formed in (i).

13. A process according to claim 1, wherein said monomers used to prepare said surfactant-free composition in (i) comprise more than one kind of monomer.

14. A process according to claim 1, wherein an initiator is also added during (iii).

15. A process according to claim 14, wherein said initiator added during (iii) is a free radical initiator.

16. A process according to claim 15, wherein said free radical initiator added during (iii) is an initiator that attaches to a polymer to form ionic, hydrophilic end groups thereon.

17. A process according to claim 1, wherein said free radical initiator is a persulfate initiator.

18. A process according to claim 1, wherein the free radical initiator added in (ii) is from 5 to 100 percent by weight of the total amount of initiator used to prepare the latex polymer.

* * * * *